US012619848B2

(12) United States Patent
Schwerdt

(10) Patent No.: US 12,619,848 B2
(45) Date of Patent: May 5, 2026

(54) COMMUNICATION SYSTEM FOR COLLECTING INFORMATION ABOUT A MOBILE DEVICE

(71) Applicant: Response Engine Holdings LLC, Gardnerville, NV (US)

(72) Inventor: Jeffrey Schwerdt, Gardnerville, NV (US)

(73) Assignee: Response Engine Holdings LLC, Gardnerville, NV (US)

( * ) Notice: Subject to any disclaimer, the term of this patent is extended or adjusted under 35 U.S.C. 154(b) by 0 days.

(21) Appl. No.: 18/468,130

(22) Filed: Sep. 15, 2023

(65) Prior Publication Data

US 2024/0111983 A1      Apr. 4, 2024

Related U.S. Application Data

(60) Provisional application No. 63/411,872, filed on Sep. 30, 2022.

(51) Int. Cl.
*G06K 19/06* (2006.01)
*G06V 30/224* (2022.01)

(52) U.S. Cl.
CPC ..... *G06K 19/06037* (2013.01); *G06V 30/224* (2022.01)

(58) Field of Classification Search
CPC ............ G06K 19/06037; G06V 30/224; G06F 16/9554
See application file for complete search history.

(56) References Cited

U.S. PATENT DOCUMENTS

| | | | | |
|---|---|---|---|---|
| 5,144,654 A | * | 9/1992 | Kelley | H04M 1/2755 |
| | | | | 379/355.09 |
| 8,532,283 B1 | * | 9/2013 | Haggerty | G06Q 30/02 |
| | | | | 379/266.07 |
| 9,407,633 B2 | | 8/2016 | Gill et al. | |
| 11,232,663 B2 | | 1/2022 | Lodha et al. | |
| 2009/0157792 A1 | * | 6/2009 | Fiatal | H04L 63/08 |
| | | | | 709/201 |
| 2009/0258678 A1 | * | 10/2009 | Chava | H04Q 9/00 |
| | | | | 455/557 |
| 2009/0300025 A1 | * | 12/2009 | Rothschild | G06F 16/40 |
| 2011/0138175 A1 | * | 6/2011 | Clark | H04L 51/212 |
| | | | | 713/168 |
| 2013/0027561 A1 | * | 1/2013 | Lee | H04N 23/611 |
| | | | | 705/7.41 |

(Continued)

OTHER PUBLICATIONS

KR20150129634A—Method for Processing Electronic Document, 63 pages. (Year: 2025).*

*Primary Examiner* — Tuyen K Vo
(74) *Attorney, Agent, or Firm* — Woodard Emhardt Henry Reeves & Wagner LLP

(57) ABSTRACT

A system and method for collecting information about a mobile device and associating it with a user. At least a portion of data about a user may be encoded into one or more images, along with optional commands or parameters for activating an app or other software or hardware modules of the mobile device. The image may be scanned by the mobile device, causing the mobile device to decode the data from the image, and to optionally automatically send the data back to the system thus confirming that association between the mobile device and the user.

19 Claims, 2 Drawing Sheets

(56)     References Cited

U.S. PATENT DOCUMENTS

| 2013/0205189 A1* | 8/2013 | DiPierro | ............... | G06F 3/0483 |
| | | | | 715/224 |
| 2015/0170164 A1 | 6/2015 | Marsico | | |
| 2018/0144307 A1* | 5/2018 | West | .................. | G06Q 20/3274 |
| 2020/0394230 A1* | 12/2020 | Urankar | .............. | G06F 12/0802 |
| 2021/0181359 A1* | 6/2021 | McLellan | ............... | H04W 4/20 |
| 2021/0350883 A1 | 11/2021 | Li et al. | | |
| 2022/0067740 A1 | 3/2022 | Patel et al. | | |
| 2023/0206193 A1* | 6/2023 | Deshpande | .......... | G06Q 20/389 |
| | | | | 705/39 |

* cited by examiner

200

201 — Receive Data Mobile Device Users

202 — Create/Update User Records

203 — Determine Records to Encode

204 — Encode User Data and/ or Commands

205 — Generate Encoded Image

206 — Export Data and/ or Encoded Images for Presentation

207 — Make the Image Available for Scanning by the Public

208 — Receive Decoded Data from Mobile Device(s)

209 — Update Records

210 — Export Updated Records

COMMUNICATION SYSTEM FOR COLLECTING INFORMATION ABOUT A MOBILE DEVICE

CROSS-REFERENCE TO RELATED APPLICATION

This application claims the benefit of U.S. Provisional Application No. 63/411,872 filed Sep. 30, 2022, which is hereby incorporated by reference.

BACKGROUND

The present disclosure relates generally to systems and methods of capturing information about a mobile device by scanning encoded data presented on a physical item.

SUMMARY

Disclosed is a communication system for capturing useful information about a mobile device and automatically associating that information with a name, address, or other contact information for a user of the device.

In one aspect, the system receives data about one or more users that are optionally identified by a unique identifier, or by a combination of data fields. This data may be present in an existing data store that is part of the system, or it may be obtained from a remote system that may be operated by a third party. In another aspect, at least a portion of the data is optionally encoded and presented as an image, such as a bar code or QR code.

The encoded data may be a portion of the overall data known about a user such as the user's name, address, location and the like. The encoded data may include a unique identifier of the user, and/or an identifier that may be unique to the mobile device (such as a phone number, IMEI number, and the like), if this information is known at the time the image is encoded.

In another aspect, the encoded image may be presented to a user (or multiple users) either on a physical item (such as a print mailing, sticker, or the product itself), or on a display device such as a display in a public place, etc. A mobile device may then be used to capture the image and decode the data encoded in the image. In one aspect, the decoded data may include commands and/or data optionally defining actions the mobile device may take to collect information about the user and/or the mobile device. This information may include address information, IMEI numbers, personal preferences, purchase histories, browsing histories, and the like.

The update may be received by the system using the Short Message Service (SMS), or by any other suitable protocols using a communication link. The input data received via the communication link may include a unique identifier that was encoded in the image initially. This identifier may be used by the system to cross reference the input data received to an existing data record, or the input data may be added as a new record when no existing record is in the data store containing user information when the input data is received from the user device.

Further forms, objects, features, aspects, benefits, advantages, and examples will become apparent from a detailed description and drawings provided herewith.

DETAILED DESCRIPTION

Figure 1:
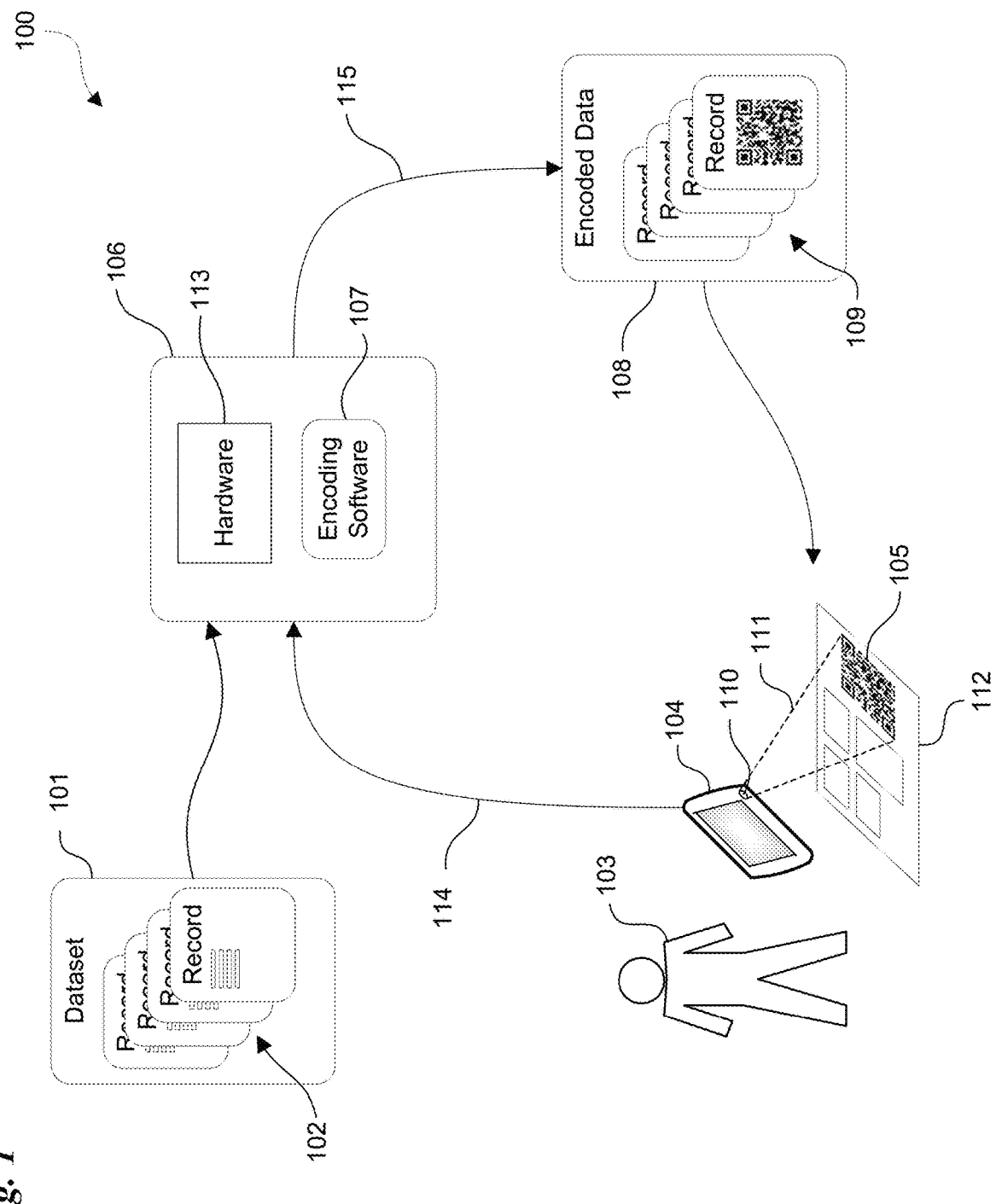
FIG. 1 is a component diagram illustrating one example of aspects of the disclosed communication system.

Disclosed is a communication system for capturing identifying information about a mobile device and automatically associating that information with a name, address, or other contact information for a user of the device. In one aspect, the system optionally accepts input by scanning a bar code, QR code, or other image that may be printed on a physical document such as a direct mail print advertisement. In another aspect, the image may be scanned after presentation on a display device such as a screen. Aspects of the disclosed system 100 are illustrated in FIG. 1.

In one aspect, a dataset 101 may include multiple data records 102, and these records may include a partial set of data about a person. Records 102 may include name, address, email address, and the like, for individuals such as user 103. Records 102 may, however, lack information about a mobile device 104 the user 103 may use.

The system of the present disclosure is operable to determine and associate a mobile device to a specific record 102 according to input received such as by scanning of a bar code, QR code, or other image 105 that is encoded with information specific to a record 102, and that is also specific to the user 103 of the device 104. In this aspect, the camera or other device used by the mobile device to capture the image 105 is operable as an input device.

In one example, the system may obtain or be given access to the dataset 101 with records 102. These may be obtained in any suitable way such as by accessing the records stored on a computer that is operated by a third party, by entering the data into a computer of the disclosed system such as computer 106, and the like.

The system 100 optionally includes encoding software 107 that may be executed on a computer 106. Computer 106 may include hardware 113 which may include, but is not limited to, one or more processors, memory, networking modules, input/output devices, and the like. Computer 106 may communicate directly, or indirectly, with other components of the system via communication links 114, 115.

Software 107 optionally configures computer 106 to generate encoded data 108 that includes one or more encoded records 109. In one aspect, the encoding software 107 encodes data from records 102 as an image, such as a QR code, bar code, or other image containing encoded or embedded data. In one example, each encoded record 109 corresponds to a record 102. At least a portion of the data in records 102 may be encoded in corresponding records 109. In another aspect, each record 109 may include a unique identifier that is specific to an individual record 102 thus uniquely linking an encoded image to a specific data record. The unique identifier may be a single value, or a combination of multiple values taken together.

In another aspect, the records 109 may be included in a printed physical document, displayed on a display device, or otherwise visually presented so that they can, for example, be scanned and decoded by a mobile device. For example, a direct mail advertising brochure 112 may be prepared and mailed to the address associated with a particular user 103. The record 102 for an individual user may include the mailing address for the user, along with other information about the user, and this mailing address may be used in preparing the brochure for mailing. The brochure optionally includes the image 105 generated by encoding the data that is associated with user 103.

User 103 may use mobile device 104 to scan the image 105 that includes the encoded data using a camera 110 of the mobile device. This scanning or image capture action may be performed by positioning the image 105 within the field of view 111 of the camera and activating the image capture application of the mobile device. The mobile device 104 may be configured to decode the image 105, thus obtaining data from the image 105 in binary, text, or in any other suitable form for processing by mobile device 104. In another aspect, the mobile device 104 may include hardware, software, or any combination thereof, for processing the captured image and decoding it. The mobile device may include a software application that is programmed to decode the input data from the image 105 when the software application is executed by one or more processors of the mobile device.

In another aspect, the image 105 may be encoded with commands, instructions, or parameters, one or more of which may be a URI as discussed above. The mobile device 104 is optionally responsive to these commands, instructions, or parameters and may be operable to automatically communicate with the computer 106 when the mobile device 104 decodes one of the one or more images. In another aspect, the commands encoded in the image 105 may include a command to activate an application of the mobile device 104.

In one example, the application is operable to establish a communication link such as communication link 114 with the computer 106. In another aspect, the commands, instructions, or parameters encoded in the image 105 may include parameters defining how the application is to deliver some or all of the data encoded in image 105 to computer 106.

For example, the image 105 may be encoded with a predetermined message and optionally with other values operable as activation codes or parameters. The input provided from decoding image 105 may be configured to automatically activate the SMS hardware and software aspects of the mobile device. The data received by scanning the image 105 may cause mobile device 104 to activate the SMS system of the mobile device and to optionally prepopulate an SMS message, and/or to automatically send the message to a predetermined address or number. In another aspect, the input data may define a prepopulated SMS message to display to the user using the SMS application of the mobile device, and it may then send the message upon receiving input from the user (e.g. activating a "send" or "submit" button in a user interface of the mobile device.)

This message may optionally be automatically communicated back to computer 106 via a text message using communications link 114 and the SMS message delivery capabilities, or by other means, of the mobile device 104. Computer 106 may then receive the text message, or alternatively, the contents of the message may be delivered to computer 106. Computer 106 is optionally operable to update the appropriate record 102 of the data set 101. In this way, a particular record 102 may be updated with information about the mobile device 104, such as the phone number or other identifying information for the device. For example, the identifying information may include, or consist of, the International Mobile Equipment Identity (IMEI) number.

In another example, the image 105 may include a Universal Resource Indicator (URI) prepopulated encoded with data about the individual from a record 102, and/or data about the mobile device 104. This data may include any data about a user discussed herein such as the user's identifying information, address, the telephone number for the device, or other information about the device. This URI may direct the user 103 to access the URI, or alternatively, the mobile device 104 may be configured to automatically access the URI. Accessing this URI may then cause computer 106 to receive the data encoded in the URI thus confirming that a particular encoded image has been scanned by a particular mobile device.

In another example, the application activated by mobile device 104 is optionally operable to display a message on a display device of the mobile device. This message may be of any suitable type, and may include text defining information about data that will be sent to the computer 106 from the mobile device 104. This message may also include other information such as the source of the encoded data, where the data will be sent, advertising or other marketing information, and the like.

In another aspect, the data encoded in the image optionally specifies a location and other parameters specifying where the body of the message may be retrieved such as from computer 106. In this way, the data encoded in the image 105 may be kept to a minimum while allowing more complex messaging to be delivered to mobile device 104 such as movies, audio, still images, and the like.

In another aspect, the system is optionally operable to send encoded data from data set 101, along with images like image 105, as exported data provided to a print service. The print service may be operated by third party, and may be operable to apply the encoded images, and other information, to a physical object. This physical object may be a sticker, flyer, brochure, a product being sold or given away, and the like.

Figure 2:
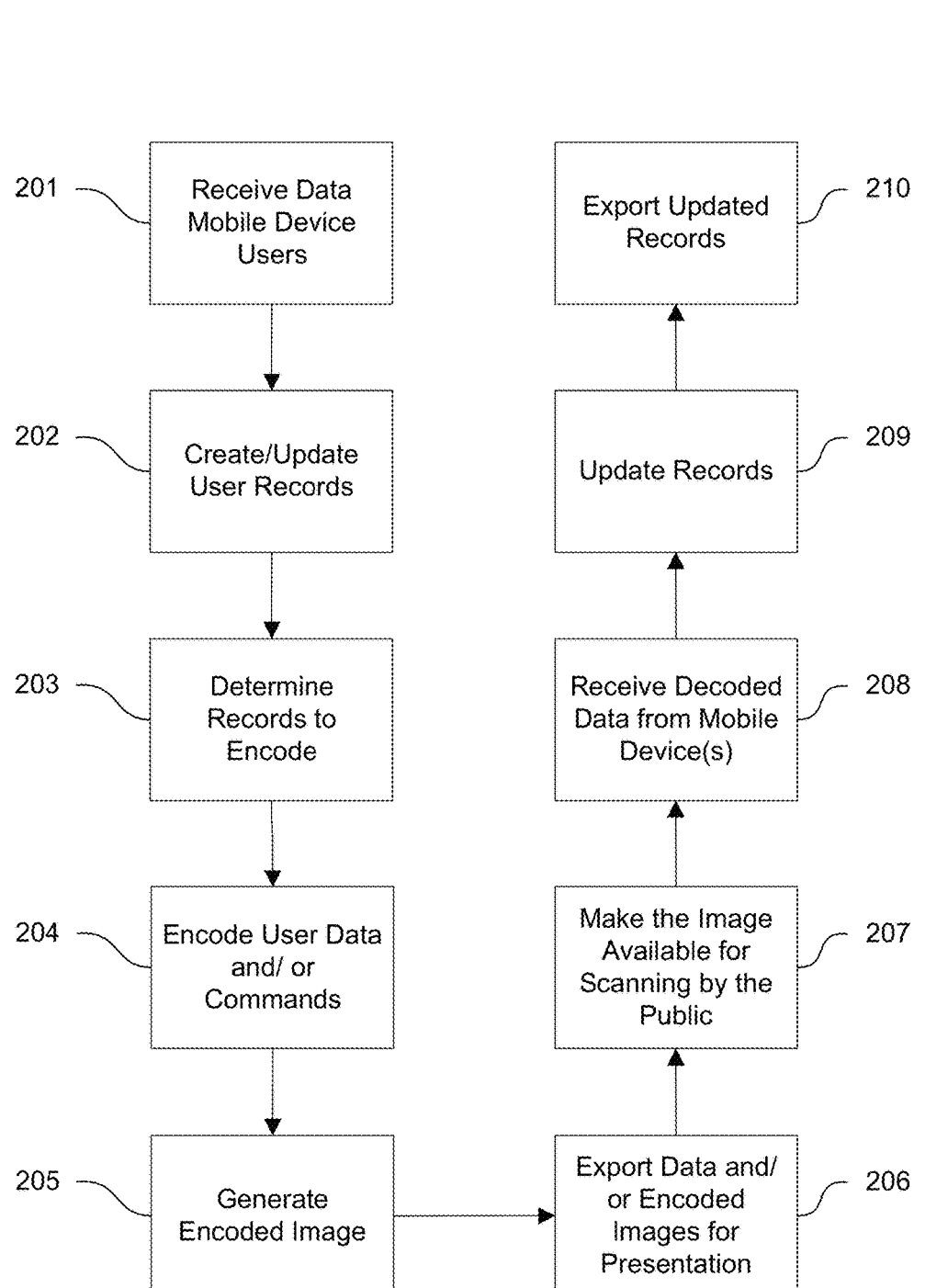
FIG. 2 is a flow chart illustrating actions that may be taken by the system of FIG. 1.

One example of the actions the disclosed system may take is illustrated in FIG. 2 at 200. The actions shown are optional, and some or all of them may not be necessary in some situations, and other actions besides what is shown here may also be taken as well. The actions are illustrated sequentially; however, no assumption should be made with respect to the order of the actions as some actions may be performed in parallel, or in a different order that what may or may not be deduced from FIG. 2.

At 201, the system receives data about mobile users. This data may be received in any suitable format and media. For example, the data may be received via one or more calls to an Application Programming Interface (API) with connectivity to a data store. The data store may be made available by a third party, or from any suitable source. The data may include individual data values, partial records, or full records about potential respondents or users of one or more mobile devices. In another example, the data may be made available via one or more uploaded files that may contain records or data in a text, binary, or other format readable by the system. In another example, the data or records may be obtained from input provided by a user and captured by the system using a user interface. This user interface may be generated or otherwise provided by one or more computers of the system, or by computers operated by a third party.

The data received may be automatically parsed or otherwise processed by one or more processors of the disclosed system to obtain individual data values, partial records, or complete records about potential respondents such as mobile device users. The records in the database (such as dataset 101) may be created or updated accordingly at 202.

Data about the users that may be encoded for presentation to respondents may be determined at 203. This determination may be made according to aspects of the user data such as by selecting those user records based on age, location, gender, purchase history, hobbies, interests, interactions on social media platforms, and the like. Any data recorded about users may be used as criteria for selecting users to include. In another example, user records may include one or more campaign identifiers, meta-data fields, or other tags grouping users together in ways that may be arbitrary or assigned by third parties.

The selected data records, or any portion thereof, are optionally encoded at 204 and may include any suitable commands indicating to the mobile device actions to take upon decoding the data. In another aspect, each record and the associated commands that may be included, is optionally encoded in an image at 205, preferably a separate image for each record, such as in the case of a bar code, QR code, or other such machine readable pattern. The commands may include commands defining instructions to execute a particular application such as a browser, SMS messaging app, or other app installed and configured for execution on the mobile device. The commands may also include commands defining requests to retrieve information stored in the mobile device that the system seeks to obtain such as phone number, IMEI number, name, address, stored contacts, or other information stored on the device. In another aspect, the system may rely on default actions that most, if not all, mobile devices are likely to take, or are required to take, in response to decoding a QR code or other such image. Thus the encoded image may be free of commands or related parameters and may contain only encoded data.

The data and/or the encoded image(s) specific to that particular set of data are optionally exported at 206 in preparation for presentation to the public. The data and/or the encoded image may be subsequently made available to the public at 207 by any suitable means. In one example, the encoded image, such as a QR code, may be printed and mailed to the mobile device users according to the address information associated with the user that was used to generate the image at 203 and 204. In another aspect, the image may be presented on a display device in a common location such as on a screen in a shopping mall, bus terminal, airport, sports arena, concert hall, park, hotel, or any other location that might be visited by a mobile device user or prospective respondent. In another aspect, the image may be included as an E-Commerce product "ride along". The "ride along" may comprise a card or other physical document that is sent along with an item purchased online. The "ride along" may include a QR code or other image that incorporates encoded data offering a special offer when the user scans the code. As disclosed herein, the QR code or other encoded image optionally provides a vehicle for attributing identifying information such as a telephone number for a mobile device with a mobile device user's contact information such as mailing address, and the like.

A mobile device, such as a tablet, smart phone, and the like, may be used to capture the encoded image and to decode the data encoded at 204. Commands in the encoded data may be used to indicate to the mobile device actions to take in response, such as activating a message app or browser and populating the app or browser with data encoded in the image. As noted above, the system may rely on default actions that most, if not all, mobile devices are likely to take, or required to take, after decoding the image. Thus the image may not include encoded commands, but only encoded data about the prospective respondent, or other data.

The mobile device optionally establishes a communication link with one or more computers of the disclosed system to electronically transmit the information obtained from the mobile device. This data may be received by the system at 208. In another aspect, the encoded data may include codes, identifiers, and the like, as disclosed herein, so that when the mobile device sends the data back to the system, the system can automatically cross-reference a message received from the mobile device with an existing record in the database if one is present. The data received may then be updated at 209, or used as input into an algorithm of the system that processes the data before it is updated. In some instances, the data in a message received from the mobile device may not correlate to an existing user record prompting the system to create a new record. In another aspect, the updated records may be exported from the system at 210 for analysis, or for other uses, which may be undertaken by third parties.

In another aspect, the disclosed system may be useful for instructions. Encoded data in the form of an image may be sent with a physical item, or made available on a display device such as in response to a request for information from a remote host via a communication link. An image containing encoded data may be scanned by the user according to the present disclosure thus associating a user with a particular product, and optionally automatically adding the user to a list of users who may receive SMS messages, or other notifications regarding additional hints, tip, instructions, updates, and the like.

In another example, the disclosed system may be useful for activating a product, or for confirming that a particular user purchased product. For example, scanning a code according to the present disclosure may be useful for registering that a cell phone was purchased and delivered, that the phone was activated, and for associating that particular cell phone with a particular buyer.

In other examples, a specialized QR code is optionally printed on stickers and coupled to seat locations thus tying a particular seat to a unique set of encoded data specific to that seat. In a real estate sales context, a specially encoded QR code may be posted on a sign advertising a home for sale. Scanning the code according to the present disclosure may be used to indicate who took interest in the advertisement and may be interested in more information. An image of with encoded data may optionally be added to email thus using the system of the present disclosure to associate a contact record name and email with a mobile number. A unique QR code may be displayed as part of a TV or online advertisement thus allowing interested users to be verified and to receive updates or sale information about the product. A custom QR code may be added to eBooks or other digital media giving users the option to obtain bonus material, be added to a wait list, or to obtain updates on upcoming audio book.

Other aspects of the disclosed system and method for a communication system are included in the following non-limiting numbered examples:

Example 1: A method that includes receiving data about one or more users identified by a unique identifier using one or more processors of one or more computers, wherein the data about one or more users is obtained from a remote computer separate from the one or more computers.

Example 2: The method of any preceding example, including encoding at least a portion of the data into one or more images using the one or more processors, wherein the portion of the data includes the unique identifier, and wherein at least one of the one or more images is encoded to include the unique identifier that identifies the mobile device separately from other mobile devices.

Example 3: The method of any preceding example, receiving input data from a mobile device using the one or more processors, wherein the input data is received from the mobile device via a communication link, wherein the input data includes the unique identifier and at least one other piece of data.

Example 4: The method of any preceding example, wherein the corresponding images includes a QR code.

Example 5: The method of any preceding example, wherein the mobile device includes a camera operable to acquire the images.

Example 6: The method of any preceding example, wherein the at least one other piece of data from the mobile device includes a telephone number associated with the mobile device.

Example 7: The method of any preceding example, wherein the at least one other piece of data from the mobile device includes an IMEI number associated with the mobile device.

Example 8: The method of any preceding example, wherein the at least one other piece of data from the mobile device includes a location associated with the mobile device.

Example 9: The method of any preceding example, including updating the data about the one or more users to include the at least one other piece of data from the mobile device.

Example 10: The method of any preceding example, wherein the data about one or more users includes a name, address, and/or date of birth.

Example 11: The method of any preceding example, including displaying the one or more corresponding images using a display device.

Example 12: The method of any preceding example, wherein the display device is separate from the mobile device and the one or more computers.

Example 13: The method of any preceding example, including applying the at least one of the one or more images to a physical object.

Example 14: The method of any preceding example, wherein applying the one image includes printing the at least one image on one or more physical documents.

Example 15: The method of any preceding example, wherein the one or more images are encoded with commands, and wherein the mobile device is responsive to the commands and is operable to automatically communicate with the one or more computers when the mobile device decodes one of the one or more images.

Example 16: The method of any preceding example, wherein the commands include a command to activate an application of the mobile device.

Example 17: The method of any preceding example, wherein the application is operable to establish a communication link with the one or more computers, and wherein the commands include parameters defining how the application is to deliver the portion of the data to the one or more computers.

Example 18: The method of any preceding example, wherein the application is operable to display a message on a display device of the mobile device, and wherein the message displayed is included in the portion of the data encoded in the image.

Example 19: The method of any preceding example, including sending the encoded portion of the data and the images as exported data using the one or more processors; and providing the exported data to a print service operable to apply the at least one of the one or more images to a physical object.

Glossary of Definitions and Alternatives

While the invention is illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the invention. No limitation of the scope of the invention is thereby intended. Any alterations and further modifications in the described examples, and any further applications of the principles described herein are contemplated as would normally occur to one skilled in the art to which the invention relates. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader in order to aid in the reader's understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90".

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"About" with reference to numerical values generally refers to plus or minus 10% of the stated value. For example, if the stated value is 4.375, then use of the term "about 4.375" generally means a range between 3.9375 and 4.8125.

"Activate" generally is synonymous with "providing power to", or refers to "enabling a specific function" of a circuit or electronic device that already has power.

"And/or" is inclusive here, meaning "and" as well as "or". For example, "P and/or Q" encompasses, P, Q, and P with Q; and, such "P and/or Q" may include other elements as well.

"Barcode" generally refers to a visible arrangement of shapes, colors, lines, dots, or symbols fixed in some medium and arranged on the medium in a pattern configured to encode data. Examples include optical machine-readable representations of data relating to an object to which the barcode is attached such as a Universal Produce Code (UPC), or any visible patterns related to any type of Automatic Identification and Data Capture (AIDC) system. Another example of a barcode is a Quick Response Code (QR Code) which arranges various light and dark shapes to encode data.

Any suitable medium is envisioned. Examples include an adhesive label, a physical page, a display device configured to display the barcode, or any other object such as a box, a statute, a machine, or other physical structure to which the barcode is affixed or upon which it is printed. For example, a bar code may be etched into metal, machined into plastic, or formed by organizing visible three-dimensional shapes into a pattern.

The barcode may not be visible to humans but may be fixed using a substance or device that allows the barcode to be visible to sensors in a machine configured to read wavelengths of light outside those detectable by the human eye. Examples of this type of barcode include barcodes printed with ink that is only visible under ultraviolet (i.e. "black") light, or barcodes displayed using infrared light.

"Camera" generally refers to an apparatus or assembly that records images of a viewing area or field-of-view on a medium or in a memory. The images may be still images comprising a single frame or snapshot of the viewing area, or a series of frames recorded over a period of time that may be displayed in sequence to create the appearance of a moving image. Any suitable media may be used to store, reproduce, record, or otherwise maintain the images.

"Communication Link" generally refers to a connection between two or more communicating entities and may or may not include a communications channel between the communicating entities. The communication between the communicating entities may occur by any suitable means. For example, the connection may be implemented as an actual physical link, an electrical link, an electromagnetic link, a logical link, or any other suitable linkage facilitating communication.

In the case of an actual physical link, communication may occur by multiple components in the communication link configured to respond to one another by physical movement of one element in relation to another. In the case of an electrical link, the communication link may be composed of multiple electrical conductors electrically connected to form the communication link.

In the case of an electromagnetic link, the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum.

A communication link may include any suitable combination of hardware which may include software components as well. Such hardware may include routers, switches, networking endpoints, repeaters, signal strength enters, hubs, and the like.

In the case of a logical link, the communication link may be a conceptual linkage between the sender and recipient such as a transmission station in the receiving station. Logical link may include any combination of physical, electrical, electromagnetic, or other types of communication links.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network or network interface to perform various network communications upon request. The network interface may be part of the computer or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the internet. Thus, a computer may include one or more physical processors or other computing devices or circuitry and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of the disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a network. Network communications may pass through various computers operating as network appliances such as switches, routers, firewalls or other network devices or interfaces before passing over other larger computer networks such as the internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour.

Data may be organized and represented in a structured format. Examples include a tabular representation using rows and columns, a tree representation with a set of nodes considered to have a parent-children relationship, or a graph representation as a set of connected nodes to name a few.

The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Database" also referred to as a "data store", "data repository", or "knowledge base" generally refers to an organized collection of data. The data is typically organized to model aspects of the real world in a way that supports processes obtaining information about the world from the data. Access to the data is generally provided by a "Database Management System" (DBMS) consisting of an individual computer software program or organized set of software programs that allow user to interact with one or more databases providing access to data stored in the database (although user access restrictions may be put in place to limit access to some portion of the data).

In another aspect, the DBMS provides various functions that allow entry, storage and retrieval of large quantities of information as well as ways to manage how that information is organized. A database is not generally portable across different DBMSs, but different DBMSs can interoperate by using standardized protocols and languages such as Structured Query Language (SQL), Open Database Connectivity (ODBC), Java Database Connectivity (JDBC), or Extensible Markup Language (XML) to allow a single application to work with more than one DBMS.

In another aspect, a database may implement "smart contracts" which include rules written in computer code that automatically execute specific actions when predetermined conditions have been met and verified. Examples of such actions include, but are not limited to, releasing funds to the appropriate parties, registering a vehicle, sending notifications, issuing a certificate of ownership transfer, and the like. The database may then be updated when the transactions specified in the rules encoded in the smart contract are completely executed. In another aspect, the transaction specified in the rolls may be irreversible and automatically executed without the possibility of manual intervention. In another aspect, only parties specified in the rules of the smart contract who have been granted permission may be notified or allowed to see the results.

Databases and their corresponding database management systems are often classified according to a particular database model they support. Examples include a DBMS that relies on the "relational model" for storing data, usually referred to as Relational Database Management Systems (RDBMS). Such systems commonly use some variation of SQL to perform functions which include querying, formatting, administering, and updating an RDBMS. Other examples of database models include the "object" model, chained model (such as in the case of a "blockchain" database), the "object-relational" model, the "file", "indexed file" or "flat-file" models, the "hierarchical" model, the "network" model, the "document" model, the "XML" model using some variation of XML, the "entity-attribute-value" model, and others.

Examples of commercially available database management systems include PostgreSQL provided by the PostgreSQL Global Development Group; Microsoft SQL Server provided by the Microsoft Corporation of Redmond, Washington, USA; MySQL and various versions of the Oracle DBMS, often referred to as simply "Oracle" both separately offered by the Oracle Corporation of Redwood City, California, USA; the DBMS generally referred to as "SAP" provided by SAP SE of Walldorf, Germany; and the DB2 DBMS provided by the International Business Machines Corporation (IBM) of Armonk, New York, USA.

The database and the DBMS software may also be referred to collectively as a "database". Similarly, the term "database" may also collectively refer to the database, the corresponding DBMS software, and a physical computer or collection of computers. Thus the term "database" may refer to the data, software for managing the data, and/or a physical computer that includes some or all of the data and/or the software for managing the data.

"Display device" generally refers to any device capable of being controlled by an electronic circuit or processor to display information in a visual or tactile. A display device may be configured as an input device taking input from a user or other system (e.g. a touch sensitive computer screen), or as an output device generating visual or tactile information, or the display device may configured to operate as both an input or output device at the same time, or at different times.

The output may be two-dimensional, three-dimensional, and/or mechanical displays and includes, but is not limited to, the following display technologies: Cathode ray tube display (CRT), Light-emitting diode display (LED), Electroluminescent display (ELD), Electronic paper, Electrophoretic Ink (E-ink), Plasma display panel (PDP), Liquid crystal display (LCD), High-Performance Addressing display (HPA), Thin-film transistor display (TFT), Organic light-emitting diode display (OLED), Surface-conduction electron-emitter display (SED), Laser TV, Carbon nanotubes, Quantum dot display, Interferometric modulator display (IMOD), Swept-volume display, Varifocal mirror display, Emissive volume display, Laser display, Holographic display, Light field displays, Volumetric display, Ticker tape, Split-flap display, Flip-disc display (or flip-dot display), Rollsign, mechanical gauges with moving needles and accompanying indicia, Tactile electronic displays (aka refreshable Braille display), Optacon displays, or any devices that either alone or in combination are configured to provide visual feedback on the status of a system, such as the "check engine" light, a "low altitude" warning light, an array of red, yellow, and green indicators configured to indicate a temperature range.

"Input Device" generally refers to any device coupled to a computer that is configured to receive input and deliver the input to a processor, memory, or other part of the computer. Such input devices can include keyboards, mice, trackballs, touch sensitive pointing devices such as touchpads, or touchscreens. Input devices also include any sensor or sensor array for detecting environmental conditions such as temperature, light, noise, vibration, humidity, and the like.

"International Mobile Equipment Identity (IMEI)" generally refers to a unique 15-digit serial number for identifying a device. Every mobile phone in the world has one. IMEI numbers are stored in a database called the Equipment Identity Register (EIR), which contains information about all valid mobile phone equipment.

"Location Finding System" generally refers to a system that tracks the location of objects or people in real time. Such systems include space-based systems like the Global Positioning System (GPS) which may use a receiver on earth in communication with multiple satellite mounted transmitters in space. Such systems may use time and the known position of the satellites to triangulate a position on earth. The satellites may include accurate clocks that are synchronized to each other and to ground clocks. The satellites may be configured to continuously transmit their current time and position. The ground-based receiver may monitor multiple satellites solving equations in real time to determine the precise position of the receiver. Signals from four satellites may be required for a receiver to make the necessary computations.

In another example sometimes referred to as "Real-time Locating Systems" (RTLS), wireless tags are attached to objects or worn by people. Receivers maintained at known, fixed reference points may receive wireless signals from the tags and use signal strength information to determine their location.

The tags may communicate using electromagnetic energy which may include radio frequency (RF) communication, optical, and/or acoustic technology instead of or in addition to RF communication. Tags and fixed reference points can be transmitters, receivers, or both. Location information may or may not include speed, direction, or spatial orientation, and may in some cases be limited to tracking locations of objects within a building or contained area.

Wireless networking equipment may be engaged as well. In one example, known signal strength readings may be taken in different locations serviced by a wireless network such as in 802.11 Wi-Fi network. These known signal strength readings may be used to calculate or triangulate approximate locations by comparing measured signal strength received from a tag against a stored database of Wi-Fi readings or Received Signal Strength Indicators (RSSI). In this way, one or more probable locations may be indicated a virtual map.

In another example, a wireless network transmitter may be configured to send reference signal strength information in packets or datagrams received by the tags. The tags may be configured to measure and/or calculate the actual signal strength of the signal received from the sending transmitter and compare this actual signal strength to reference signal strength information to determine an approximate distance from the transmitter. This distance information may then be sent to other servers or components in the location finding system and used to triangulate a more precise location for a given tag.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Module" or "Engine" generally refers to a collection of computational or logic circuits implemented in hardware, or to a series of logic or computational instructions expressed in executable, object, or source code, or any combination thereof, configured to perform tasks or implement processes. A module may be implemented in software maintained in volatile memory in a computer and executed by a processor or other circuit. A module may be implemented as software stored in an erasable/programmable nonvolatile memory and executed by a processor or processors. A module may be implanted as software coded into an Application Specific Information Integrated Circuit (ASIC). A module may be a collection of digital or analog circuits configured to control a machine to generate a desired outcome.

Modules may be executed on a single computer with one or more processors, or by multiple computers with multiple processors coupled together by a network. Separate aspects, computations, or functionality performed by a module may be executed by separate processors on separate computers, by the same processor on the same computer, or by different computers at different times.

"Multiple" as used herein is synonymous with the term "plurality" and refers to more than one, or by extension, two or more.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11 (b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a body area network (BAN), a personal area network (PAN), a low power wireless Personal Area Network using IPv6 (6LoWPAN), a local-area network (LAN), a metropolitan area network (MAN), a wide area network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP internet protocol suite may include application layer, transport layer, internet layer (including, e.g., IPv6), or the link layer.

"Optionally" as used herein means discretionary; not required; possible, but not compulsory; left to personal choice.

"Output Device" generally refers to any device or collection of devices that is controlled by computer to produce an output. This includes any system, apparatus, or equipment receiving signals from a computer to control the device to generate or create some type of output. Examples of output devices include, but are not limited to, screens or monitors displaying graphical output, any projector a projecting device projecting a two-dimensional or three-dimensional image, any kind of printer, plotter, or similar device producing either two-dimensional or three-dimensional representations of the output fixed in any tangible medium (e.g. a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Personal computing device" generally refers to a computing device configured for use by individual people. Examples include mobile devices such as Personal Digital Assistants (PDAs), tablet computers, wearable computers installed in items worn on the human body such as in eyeglasses, watches, laptop computers, portable music/video players, computers in automobiles, or cellular telephones such as smart phones. Personal computing devices can be devices that are typically not mobile such as desk top computers, game consoles, or server computers. Personal computing devices may include any suitable input/output devices and may be configured to access a network such as through a wireless or wired connection, and/or via other network hardware.

"Portion" means a part of a whole, either separated from or integrated with it.

"Predominately" as used herein is synonymous with greater than 50%.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of Santa Clara, California, USA. Other examples of commercially available processors include but are not limited to the X8 and Freescale Coldfire processors made by Motorola Corporation of Schaumburg, Illinois, USA; the ARM processor and TEGRA System on a Chip (SoC) processors manufactured by Nvidia of Santa Clara, California, USA; the POWER7 processor manufactured by International Business Machines of White Plains, New York, USA; any of the FX, Phenom, Athlon, Sempron, or Opteron processors manufactured by Advanced Micro Devices of Sunnyvale, California, USA; or the Snapdragon SoC processors manufactured by Qalcomm of San Diego, California, USA.

A processor also includes Application-Specific Integrated Circuit (ASIC). An ASIC is an Integrated Circuit (IC) customized to perform a specific series of logical operations is controlling a computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Uniform Resource Identifier (URI)" generally refers to a string of characters or other data used to identify a resource. A resource identifier may be thought of as a locator, a name, or both and need not conform to any particular convention. For example, a random string of data bits or characters, a machine generated hash code, a telephone number, a "mailto" tag with an address, a Uniform Resource Identifier (URI), a Uniform Resource Locator (URL), or any combination thereof my operate as resource identifiers. A resource identifier may be "uniform" in that it may conform to a preexisting standard (such as in the case of a URI), but such a uniform nature is not required. A resource identifier need only be recognizable at least to the system making the resource available and be usable by the system requesting the resource.

Examples include representations of a resource using specific protocols over a network, such as the World Wide Web. In this context, resource identifier such as a URI may conform to a specific standard specifying a concrete syntax and associated protocols. The most common form of resource identifier is the Uniform Resource Locator (URL), frequently referred to informally as a web address. More rarely seen in usage is the Uniform Resource Name (URN), which was designed to complement URLs by providing a mechanism for the identification of resources in particular namespaces.

The term "Uniform Resource Locator" (URL) refers to the subset of URIs that, in addition to identifying a resource, define a specific means of locating the resource by describing its primary access mechanism (e.g., its network "location"). The term "Uniform Resource Name" (URN) has been used historically to refer to both URIs under the "urn" scheme, which are required to remain globally unique and persistent even when the resource ceases to exist or becomes unavailable, and to any other URI with the properties of a name.

For example, a URI may conform to The Internet Engineering Task Force (IETF) RFC 2396 entitled "Uniform Resource Identifiers (URI): Generic Syntax." In this case, the URI would at least conform to the following format:

scheme:[//[user[:password]@]host[:port]][/path][?query]
[#fragment]

"Scheme" generally refers to a sequence of characters beginning with a letter and followed by any combination of letters, digits, plus sign, period, or hyphen. The scheme is followed by a colon. Examples of popular schemes include http, https, ftp, mailto, file, data, and IRC. Most URI schemes are standardized and registered with the Internet Assigned Numbers Authority (IANA), although non-registered schemes are used in practice. The two slashes (e.g. "//") are required by some schemes and not required by some others. When the authority component is absent, the path component cannot begin with two slashes.

"User" and "password" generally refers to optional components of a URI that together form an "authentication section" that if present, is followed by an "at" symbol (an "@")

"Host" generally refers to either a registered name (including but not limited to a hostname), or an IP address. IPv4 addresses are represented in dot-decimal notation, and IPv6 addresses are enclosed in square brackets ("[ ]").

"Port number" generally refers to an identifier specifying a process to which a network message is to be forwarded when it arrives at a host. It is optional in a URI, and if present, is separated from the hostname by a colon.

"Path" generally refers to location data specifying where to find the requested resource on the host. A path is usually organized in hierarchical form like a file system path with elements indicating nodes in a tree structure, the elements separated by a delimiter such as a slash. The path may map mirror the host file system, or a portion thereof, but this is only one implementation of the path concept and is not required. Thus a path may be any suitable string of characters. The path begins with a single slash (/) if an authority part was present, and may also if one was not, but cannot begin with a double slash. The path is always defined, though the defined path may be empty (zero length).

"Query" generally refers to an optional portion that is separated from the preceding part of the URI by a question mark. The query includes a string of characters representing data available to the recipient host. Any suitable string of characters may follow the question mark. By convention, the string is commonly a sequence of attribute—value pairs separated by a delimiter such as an ampersand sign (an "&"). For example "?type=car&name=mustang" includes two key/value pairs where the keys are "type" and "name" respectively, and the corresponding values are "car" and "mustang", both pairs separated by an ampersand character.

"Fragment" generally refers to an optional portion that is separated from the preceding part by a hash symbol (a "#"). The fragment includes an identifier providing additional input to a secondary resource, such as a section heading in an article identified by the remainder of the URI. When the primary resource is an HTML, document, the fragment is often an id attribute of a specific element, and web browsers commonly automatically scroll the page until this element is in view.

"Retain" generally refers to the act of keeping possession or use of something; the act of remembering by keeping in mind or memory, such as in the context of storing in a computer memory whether in volatile, nonvolatile, or other memory; or to hold one object secure or intact relative to another such as in the physical sense via a fastening member or material.

"Uniform Resource Locator (URL)" generally refers to a reference to a web resource that specifies the location of the resource on a computer network and a mechanism for retrieving it. A URL is an example of, or type of, Uniform Resource Identifier (URI) that identifies a resource by a standard representation of its primary access mechanism (e.g., its network "location"), rather than by some other attribute. URLs occur most commonly to reference web pages (http), but are also used for file transfer (ftp), email (mailto), database access (JDBC), and many other applications. A URL is sometimes informally referred to as a "web address".

"Rule" generally refers to a conditional statement with at least two outcomes. A rule may be compared to available data which can yield a positive result (all aspects of the conditional statement of the rule are satisfied by the data), or a negative result (at least one aspect of the conditional statement of the rule is not satisfied by the data). One example of a rule is shown below as pseudo code of an "if/then/else" statement that may be coded in a programming language and executed by a processor in a computer:

```
if(clouds.areGrey( ) and
(clouds.numberOfClouds > 100)) then {
    prepare for rain;
} else {
    Prepare for sunshine;
}
```

"Short Message Service (SMS)" generally refers to a text messaging service component of phone, Web, or mobile communication systems. It uses standardized communications protocols to allow fixed line or mobile phone devices to exchange short text messages. Transmission of short messages between a Short Message Service Center (SMSC) and personal computing device is done whenever using the Mobile Application Part (MAP) of the SS7 protocol. Messages payloads may be limited by the constraints of the signaling protocol to precisely 140 octets (140 octets*8 bits/octet=1120 bits). Short messages can be encoded using a variety of alphabets: the default GSM 7-bit alphabet, the 8-bit data alphabet, and the 16-bit UCS-2 alphabet. Depending on which alphabet the subscriber has configured in the handset, this leads to the maximum individual short message sizes of 160 7-bit characters, 140 8-bit characters, or 70 16-bit characters.

"Viewing Area", "Field of View", or "Field of Vision" is the extent of the observable world that is seen at any given moment. In case of optical instruments, cameras, or sensors, it is a solid angle through which a detector is sensitive to electromagnetic radiation that includes light visible to the human eye, and any other form of electromagnetic radiation that may be invisible to humans.

What is claimed is:

1. A method comprising:
   receiving data about one or more users identified by a unique identifier using one or more processors of one or more computers, wherein the data about one or more users is obtained from a remote computer separate from the one or more computers;
   encoding at least a portion of the data about one or more users into one or more images using the one or more processors of the one or more computers, wherein the portion of the data includes the unique identifier, and wherein at least one of the one or more images is encoded to include the unique identifier; and
receiving input data from a mobile device using the one or more processors of the one or more computers, wherein the input data is received from the mobile device via a communication link, wherein the input data includes the unique identifier associated with the user and at least one other piece of data that identifies the mobile device separately from other mobile devices, the at least one other piece of data comprising a telephone number, an IMEI number, or a location associated with the mobile device, or any combination thereof; and
updating, using the one or more processors, the data about the one or more users to include the at least one other piece of data that identifies the mobile device.

2. The method of claim 1, wherein the corresponding images includes a QR code.

3. The method of claim 1, wherein the mobile device includes a camera operable to acquire the images.

4. The method of claim 1, wherein the at least one other piece of data from the mobile device includes a telephone number associated with the mobile device.

5. The method of claim 1, wherein the at least one other piece of data from the mobile device includes an IMEI number associated with the mobile device.

6. The method of claim 1, wherein the at least one other piece of data from the mobile device includes a location associated with the mobile device.

7. The method of claim 1, comprising:
   updating the data about the one or more users to include the at least one other piece of data from the mobile device.

8. The method of claim 1, wherein the data about one or more users includes a name, address, and/or date of birth.

9. The method of claim 1, comprising:
   displaying the one or more images using a display device.

10. The method of claim 9, wherein the display device is separate from the mobile device and the one or more computers.

11. The method of claim 1, comprising:
    applying the at least one of the one or more images to a physical object.

12. The method of claim 11, wherein applying the one image includes printing the at least one image on one or more physical documents.

13. The method of claim 1, wherein the one or more images are encoded with commands, and wherein the mobile device is responsive to the commands and is operable to automatically communicate with the one or more computers when the mobile device decodes one of the one or more images.

14. The method of claim 13, wherein the commands include a command to activate an application of the mobile device.

15. The method of claim 14, wherein the application is operable to establish a communication link with the one or more computers, and wherein the commands include parameters defining how the application is to deliver the portion of the data to the one or more computers.

16. The method of claim 14, wherein the application is operable to display a message on a display device of the mobile device, and wherein the message displayed is included in the portion of the data encoded in the image.

17. The method of claim 1, comprising:

sending the encoded portion of the data and the images as exported data using the one or more processors; and providing the exported data to a print service operable to apply the at least one of the one or more images to a physical object.

18. The method of claim 1, comprising:

decoding at least one of the images into input data using the mobile device that is identified by the unique identifier.

19. The method of claim 1, wherein the data about the one or more users includes any one of name, address, email, location, purchase history, or date of birth, or any combination thereof.

\* \* \* \* \*